United States Patent [19]

Rilett

[11] 4,327,553

[45] May 4, 1982

[54] GAS POWERED MOTORS

[76] Inventor: John W. Rilett, The Gables, Hawkers Hill, Bibury, Gloucestershire, England

[21] Appl. No.: 72,561

[22] Filed: Sep. 4, 1979

[30] Foreign Application Priority Data

Sep. 5, 1978 [GB] United Kingdom ............... 7835603

[51] Int. Cl.³ ............................................. F01K 25/06
[52] U.S. Cl. ...................................... 60/673; 60/649; 60/671
[58] Field of Search ................. 60/671, 651, 649, 673; 62/50

[56] References Cited

U.S. PATENT DOCUMENTS

| | | | |
|---|---|---|---|
| 3,872,672 | 3/1975 | Rein | 60/649 |
| 3,987,632 | 10/1976 | Pereda | 60/671 |
| 4,092,830 | 6/1978 | Rilett | 60/671 |
| 4,195,485 | 4/1980 | Brinkerhoff | 60/649 |
| 4,224,799 | 9/1980 | Rilett | 60/671 |

Primary Examiner—A. Michael Chambers
Attorney, Agent, or Firm—Kenyon & Kenyon

[57] ABSTRACT

A gas powered motor has a reservoir for liquefied gas, a supply passage from the reservoir leading through one side of a heat exchanger to the motor and a container holding a buffer substance in heat conductive relationship with the reservoir. The buffer substance acts to supply heat to the liquefied gas while undergoing a chemical, physical crystallographic or other change of state to assist in maintaining the supply of gas to the motor from the reservoir. The motor exhaust leads to a vessel containing a condensing buffer substance which absorbs, persorbs or otherwise associates with the gas accompanied by a release of heat. The condensing buffer substance is in heat conductive relation with the other side of the heat exchanger in the gas supply to the motor to superheat the gas supplied. The condensing buffer substance is capable of releasing the gas when subjected to reduced pressure by a pump provided which may be the gas motor run in reverse to extract the gas from the vessel and return it to the reservoir. In another embodiment the condensing buffer substance comprises an isothermal heat sink provided, for example, by a concentrated salt solution.

23 Claims, 4 Drawing Figures

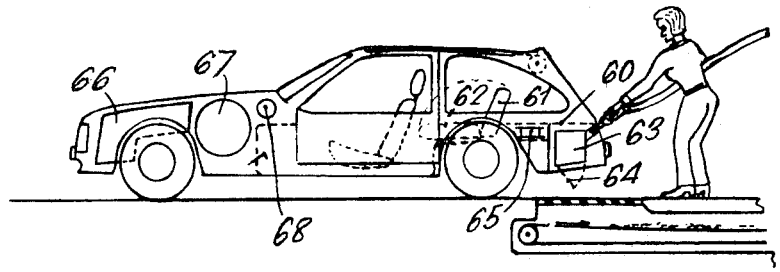

GAS POWERED MOTORS

BACKGROUND OF THE INVENTION

1. Field of the Invention

The present invention is concerned with gas-operated motors and gas-supply apparatus therefor. In particular the invention relates to motors for which the working fluid is a non-burning gas which is condensible at familiar climatic temperatures under the action of pressure alone, for example carbon dioxide, water vapour, halocarbons such as the FREONS (Registered Trade Mark) and the like. An aim of the present invention is to provide means to use such gas-operated motors at much higher power levels than was practicable heretofore and, in particular to provide means to achieve a substantially improved economy of gas and energy usage.

2. Description of the Prior Art

Motors adapted to run on a supply of carbon dioxide are already well known. Usual versions of such motors employ a simple tank as a reservoir to contain a mixture of gaseous and liquid carbon dioxide under pressure from which the gas boils off to supply the motor during operation. This process causes the tank and the gas-liquid mixture within it to become rapidly colder, with a consequent and undesirable rapid fall in pressure of the gas in the tank causing falling motor power.

Methods and apparatus which overcome this problem are described in my cognate United Kingdom Patent Application Nos. 1689/76 and 25600/76 which propose the provision of one or more container(s) holding or capable of being charged with buffer substance(s) in heat-conductive relationship with the reservoir or with a passage through which, in operation, the gas is supplied from the reservoir to the motor. By the term 'buffer substance' is meant a substance which undergoes a change in its physical, chemical, crystallographic or other state at a temperature above the final operating temperature of the gas, the said change of state causing a release of heat to the gas or liquefied gas. The choice and effects of suitable buffer substances are discussed in the complete specification of the above-numbered cognate patent applications, the disclosure of which is incorporated herein by reference.

SUMMARY OF THE INVENTION

The invention will be described hereinafter in terms of its application to engines for powering medium to large lawn mowers although it is to be noted that engines in accordance with the invention may be found equally useful in many other applications, e.g. for powering other automotive devices especially including forklift trucks, boats and trains.

The invention provides a gas powered motor having means for holding liquefied gas and supplying gas therefrom to the motor to power the motor, means for receiving expanded gas from the motor, said receiving means including a condensing buffer substance (as hereinafter defined) for condensing the gas, at the pressure received from the motor, the receiving means being capable of releasing the gas when subjected to a reduced pressure below that at which it is received from the motor.

The term condensing buffer substance as used throughout the specification is intended to mean a substance which undergoes a change in its physical, chemical or crystallographic state, or adsorptive, persorptive or other associative state the said change of state occurring as the said working fluid condenses by liquefaction, adsorption, persorption or association etc.

Prior to the present invention, the temperature of the gas leaving the gas-supply apparatus (hereinafter referred to as a "power capsule") could be no higher than that of the buffer substance(s) in the power capsule. Present power capsules employ a buffer substance which remelts by heat flow from its surroundings which may in cold weather by typically at 5° C. Clearly the buffer substance should have a freezing point below 5° C. so that it may remelt automatically; but such a low freezing point limits the power-economy of motors supplied by such power capsules to about 65 joules per gram in the case of a carbon dioxide working fluid which, though much higher than the circa 40 J/gm obtained from motors with un-buffered tanks, is still inadequate for high-powered motors where the weight and cost of $CO_2$ or other working fluid may become prohibitive.

Firstly, from the foregoing it will be seen that in order to realize the full potential of gas-operated motors of this type, there is a need to provide heat energy which is not necessarily linked to the ambient climatic temperature (because of the need to choose the buffer substance's freezing point so as to be just below that ambient temperature). The present invention achieves this object by using materials hereinafter referred to as "heat source materials."

Secondly, the present invention proposes means to condense the gas exhausted from the motor so as greatly to reduce the volume occupied by such exhausted gas and to provide means to collect it for subsequent re-use. The means to condense the gas in the present invention is given the generic name "condensing buffer substance" because the process of condensation is brought about by transferring the latent heat of vapourisation of the condensing gas to the condensing buffer substance which is the reverse of the similar process in the power capsule supplying the motor whereby the latent heat of vapourisation of the evaporating gas is transferred from a buffer substance. The condensing buffer substance may extract the latent heat of vapourisation of the condensing gas by taking in its own latent heat of fusion in which case the process of condensation will be substantially isothermal; other condensing buffer substances may extract and immediately release the latent heat of vapourisation of the condensing gas and so exhibit a rise in temperature in which case the released heat may usefully be employed elsewhere e.g. to superheat the gas being supplied to the motor: in this latter case the condensing buffer substance in effect performs the two functions of a heat source material and a means of condensing the gas.

Thirdly, the present invention proposes means to recycle the gas back to the power capsule in such a way as to restore the condensing buffer substance to its original state i.e. to extract heat from the condensing buffer substance and transfer it as heat of vapourisation to the substance being recycled. Again this reversed process may be substantially isothermal if the condensing buffer substance is chosen to employ e.g. its latent heat of fusion; other condensing substances may exhibit a fall in temperature during the recycling process in which case they may perform other useful functions e.g. to cool and condense the recycled gas. In any event the recycling process is a heat pumping process.

Finally the present invention proposes means to perform ancillary functions such as power-steering of a man-carrying lawnmower or other vehicle, load-shifting on a fork-lift truck, refrigeration in lorries or trains, etc. etc.

These proposals will now be described in more detail.

GENERAL SCHEME

In general, the use of a buffered tank to supply the motor with gas (i.e. a power capsule) is to be preferred as this ensures the supply of gas at a sensibly constant pressure which not only allows the thermodynamic efficiency of the motor to be optimised but also helps to stabilise the torque of the motor. Furthermore, the use of a buffer around the tank is a very cheap and simple way to provide the heat energy necessary to boil the working fluid for example one gram of water provides 333 joules of latent heat whereas one gram of the more expensive heat source materials described below may provide only 60 to 160 joules. Finally a buffered tank has the overriding advantage of providing heat for boiling at exactly the time that it is needed whereas other physico-chemical techniques of providing heat for boiling will usually provide heat as soon as the tank is filled, requiring the motor to be used immediately. The buffer in a power capsule begins to work only when the motor is started.

Secondly, the present invention proposes that the power capsule buffering temperature should now be chosen typically in the range $-10°$ C. to $+10°$ C., for outdoor use, for instance in the case of lawn mowers. Thus the use of water (freezing point $0°$ C.) with its high latent heat, high heat conductivity and extreme cheapness may provide an ideal choice of buffer for all power capsules for lawn mowers.

Nevertheless the present invention does allow the use of other buffering temperatures: for example a buffering temperature of $+12°$ C. may prove to be more satisfactory for appliances used indoors whereas a buffering temperature of $-25°$ C. may be chosen for forklift trucks to be used in cold stores, etc.

Thirdly, the present invention proposes the use of a superheater to heat the gas to a temperature above that of the power capsule buffer's freezing point by the employment of heat source materials in which the heat of adsorption or persorption or physico-chemical reaction is at a significant level. However the present invention suggests that this superheater (hereinafter called the "Active superheater") should normally be limited to a working fluid superheating temperature of about $200°$ C. in the case of using $CO_2$ and present-day plastics materials, and to about $300°$ C. in the case of using halocarbons and suchlike working fluids together with emergent plastics materials. Examples of the aforesaid heat source materials in the present invention can be classified under three broad headings as follows:

1. Adsorption types. The crevices and pores in the surface (and sometimes in the body) of materials such as alumina, charcoal, silica gel and the like provide a relatively large surface area on which molecules of $CO_2$ or other fluid can be adsorbed. Such adsorption is akin but not identical to condensation from gas phase to liquid phase and is accompanied by the evolution of heat skin to the heat of vapourisation of the absorbed $CO_2$ or other fluid. It is recommended that these materials should be used in the activated form, to provide higher heats of adsorption. In the present invention the heat so evolved by the supply of the working fluid to a container of an adsorptive material (called an adsorbent) is transferred to the working fluid to superheat the same before expansion in the motor. In time the adsorbent reaches a condition of equilibrium with the working fluid at which stage no more working fluid can be adsorbed. By application of heat and/or reduced pressure, however, the adsorbate can be desorbed from the adsorbent thereby to regenerate the material and restore its adsorptive capacity. The process of adsorption and desorption can be repeated in this manner substantially indefinitely.

2. Persorption types. The term "persorption" was coined by J. W. McBain (1930) to distinguish it from the ordinary (I.E. unactivated) and activated adsorption described and referred to above. In the second edition of "Textbook of Physical Chemistry" by Samuel Glasstone (Macmillan and Co. Ltd. 1966) page 1204, reference is made "to sorption of an entirely different character" followed by a description of "persorption" as follows:

"It is known from X-ray examination that the water molecules in zeolites are not held by ordinary valence bonds, but merely fit into the vacant spaces in the lattice of aluminium, silicon, oxygen and metal atoms. On dehydration the water is removed and the spaces can be filled by other molecules; dehydrated zeolites are, therefore, good sorbing agents . . . "

Some of these persorbers have become known as molecular sieves because they permit only the entry of molecules smaller than the vacant spaces in the lattice originally occupied by the water molecules.

The present invention proposes the use of such persorbers firstly because they provide heats of persorption significantly greater (e.g. 70% more) than the heats of adsorption provided for instance by activated charcoal and silica gel, and secondly because such persorbers may be chosen for their selective persorption of the molecules of the working or other fluid. Thus for example the zeolite known as chabazite, $CaAl_2Si_4O_{12}.6H_2O$ has lattice pores of approximately 3.5 Angstrom Units ("A") diameter which will admit the persorption only of molecules smaller than this size, for instance $H_2O$ and $NH_3$. Therefore this persorber is particularly useful for superheating the gas supply to a gas-operated motor using steam or ammonia as a working or heat source fluid. Other persorbers which may be used in the present invention include the following (which is not an exhaustive list):

2.1 Crystalline potassium alumino-silicate.
   Lattice pore size: About 3A
   Molecules persorbed: e.g. $H_2O$ and $NH_3$
   Molecules excluded: those over 3A in diameter e.g. ethane.

2.2 Crystalline sodium alumino-silicate
   Chemical formula: $Na_{12}(AlO_2)_{12}(SiO_2)_{12}.27H_2O$
   Molecules persorbed: $H_2O$, $NH_3$, $H_2S$, $CO_2$, $SO_2$, $C_2H_4$, $C_2H_6$, $C_3H_6$ and $C_2H_5OH$.
   Molecules excluded: those over 4A in diameter e.g. propane.
   Lattice pore size: About 4A.

2.3 Crystalline calcium alumino-silicate
   Lattice pore size: About 5A

Molecules persorbed: The above and n-$C_4H_9OH$, n-$C_4H_{10}$, $C_3H_8$ to $C_{22}H_{46}$ and FREON (Registered Trade Mark) 12.

Molecules excluded: those over 5A in diameter e.g. iso compounds and all 4 carbon rings.

2.4 Crystalline sodium alumino-silicate

Lattice pore size: About 10A.

Chemical formula: $Na_{86}(AlO_2)_{86}(SiO_2)_{106}.276H_2O$

Molecules excluded: those over 10A in diameter e.g. $(C_4F_9)_3N$.

When used to persorb $H_2O$, the above persorbers release heat in the region of 4180 joules per gram of $H_2O$. However they all reach an equilibrium with the fluid persorbed such that one gram of the persorber will persorb generally about 0.2 gram of fluid. Higher pressure tends to increase the equilibrium persorption and vice versa. Higher temperature tends to decrease the equilibrium persorption and vice versa. At the typical equilibrium persorption of 22% of $H_2O$ the above persorbers therefore release about $0.22 \times 4180 = 920$ J per gram of persorber which is approaching three times the figure of 333 J/gm obtained from the latent heat of fusion of water when used as a buffer substance. However this figure of 920 J/gm relates to the persorption of $H_2O$.

When used to persorb other fluids such as $CO_2$, the heat released is rather less. In the case of $CO_2$ the heat released is in the region of only 800 joules per gram of $CO_2$. Again the typical equilibrium persorption is about 20% so the heat released therefore is about $0.2 \times 800 = 160$ J/gm of persorber. This is about half of the 333 J/gm available from a water buffer and for that reason the present invention proposes that buffering is still the most suitable method of achieving boiling of the $CO_2$ or other working fluid in the power capsule.

However, for superheating the working fluid, persorbers (or the adsorptive types of material disclosed herein) may be preferred rather than buffer substances for several reasons as follows. First and foremost, persorbers (and to a lesser extent adsorbers) will provide heat at a temperature much higher than ambient temperature. Thus the persorber given in 2.3 above (and known as Type 5A) will persorb $CO_2$ to an equilibrium persorption of about 20% at temperatures as high as 150° C., at the pressures normally existing in an active superheater supplied from a water-buffered power capsule, namely about 30 atmospheres. Adsorbers are not so good in this respect and such types as activated alumina, charcoal and silica gel tend to desorb much of the absorbed $CO_2$ long before such superheat temperatures are reached.

Secondly, a large proportion of the heat supplied in superheating—as much as 30% with suitable design—is converted into useful motor power output, in closed-cycle motor systems. This compares with only about 15% of the boiling heat input being converted into useful output.

3. Reversible chemical or physico-chemical types.

The process of persorption in distinct from that of adsorption because in persorption the molecules of the persorbed fluid actually enter the individual molecules of the persorber. It could be argued that this process is a chemical combination between the molecules of the two substances, especially as the persorbers given in 2. above exhibit a selective preference for polar or polarizable molecules which strongly suggest that persorption involves interaction of the polar valence bonds of persorber and persorbate. Such affinity between polar valence bonds is a characteristic of chemical combination of polar substances.

Furthermore the process of persorption may be reversed by the application of heat and reduced pressure, so as to desorb the substance previously persorbed: this reversibility shows little or no hysteresis, and is also akin to reversible chemical reactions which also may be reversed by the application of heat and reduced pressure.

The present invention accordingly proposes the extension of the techniques hereinbefore described to the more general field of reversible chemical or physico-chemical reactions which are again reversible by the application of heat and/or reduced pressure.

One heat source material which can be categorised under this heading is calcium oxide CaO which can be made to associate with $CO_2$ (or with $H_2O$ in another embodiment of the present invention) under pressure so as to release heat, and to dissociate therefrom by the application of heat and reduced pressure.

As in adsorbers and persorbers the amount of $CO_2$ (or $H_2O$) which associates in equilibrium is dependent on the temperature and pressure of the $CO_2$ (or $H_2O$). However in the case of calcium oxide CaO the amount of heat released in this association—of $CO_2$ and calcium oxide to give calcium carbonate $CaCO_3$, or of $H_2O$ and calcium oxide to give calcium hydroxide $Ca(OH)_2$—is very much greater than in the case of the best persorbers. For example at atmospheric pressure the association of $CO_2$ with CaO to give calcium carbonate is quoted as releasing about 2900 joules per gram of CaO—and at a temperature of 900° C. At higher pressures, for instance the approximately 30 atmospheres which may exit in an active superheater supplied by a water-buffered power capsule, the released heat would be slightly lower but would be available at considerably higher temperatures (than 900° C.) if so desired. Generally one can expect to obtain at least 2400 J/gm of CaO when reacted with $CO_2$—compared with the figures of about 160 J/gm of persorber quoted in 2. above, namely about 15 times as much.

Alternatively the CaO may associate with $H_2O$ to give $Ca(OH)_2$ in which case the heat released at atmospheric and higher pressure will be in the region of 1800 J/gm of CaO. Although less than the 2400 J/gm (at least) available from the $CO_2$ reaction, this 1800 J/gm is nevertheless adequate in many of the high-power applications of the present invention. Generally the $H_2O$ reaction may be preferred firstly because it can be initiated at ambient temperature (especially under pressure) whereas the $CO_2$ reaction requires preheating before it will start, secondly because the $Ca(OH)_2$ can be dissolved (or "regenerated" to CaO) at lower temperatures and with less vacuum or at higher gauge pressures than $CaCO_3$ can, and thirdly because $H_2O$ is in many ways more convenient and less expensive then $CO_2$.

It is stressed that, whether $CO_2$ or $H_2O$ is used in the present invention, it can as desired be used either as the working fluid as well as the reversible reactant with CaO, or alternatively only as the reversible reactant so as to provide heat for the heating of another working fluid such as one of the halocarbons or the like. Also it is emphasized that, although both the $CO_2$ and the $H_2O$ reaction with CaO will provide heat at temperatures of at least 900° C. and 400° C. respectively, the present invention proposes that it is preferable to use this reaction heat to heat the working fluid to only 200° C. or 300° C., or so, in order that the motor may largely be made of existing or emergent plastic materials, with the exception perhaps of the motor's working chamber wall which may preferably be of metal if required to conduct heat from the reaction to the expanding gas within the working chamber. Such limitation of the working fluid temperature to 200° C. or 300° C. or so has the added advantage of providing a large mean temperature difference between the working fluid and the reaction, which encourages heat flow and so reduces the heat transfer area necessary.

The present invention is not limited to the use of CaO alone as a material which provides a reversible physico-chemical reaction with $CO_2$ or $H_2O$ and the following alternatives may also be used:

3.1. Lithium Oxide $Li_2O$.
3.2. Sodium monoxide $Na_2O$.
3.3. Sodium peroxide $Na_2O_2$-which gives an easily reversible reaction with water especially—though the product NaOH (sodium hydroxide or "Caustic Soda") is extremely corrosive.
3.4. Potassium monoxide $K_2O$.
3.5. Potassium dioxide $K_2O_2$.
3.7. Potassium peroxide $KO_2$.
3.8. Magnesium oxide MgO.
3.9 Calcium peroxide $CaO_2$.
3.10. Calcium tetroxide $CaO_4$.
3.11. Strontium Oxide SrO.
3.12. Strontium peroxide $SrO_2$.
3.13. Barium Oxide BaO, which is especially energetic with either $H_2O$ or $CO_2$, but, after reaction with $CO_2$ to give the carbonate $BaCO_3$, can be regenerated by heating with carbon—though this produces the toxic gas carbon monoxide CO.
3.14. Barium Peroxide $BaO_2$, which also has a particularly easily reversible reaction with oxygen, giving much heat.

The above list is not exhaustive and many other reversible reactions may be used, either where they react with a proportion of the working fluid, or where they react with another substance so as to provide heat for the working fluid. However the present invention is limited under this heading 3., to reactions which may be reversed by the application of heat and/or reduced pressure or, in some cases, by the addition of a fairly inexpensive substance to assist the regeneration process e.g. the addition of carbon in the regeneration of barium oxide as described in 3.13 above.

In my U.K. patent application No. 29987/77 it was proposed that the working fluid of a gas-operated motor according to that invention should, after expansion in the working chamber(s) of the motor, be exhausted to a sealed exhaust chamber from which it could be returned to the power capsule (which supplied the said motor with gas) following operation of the said motor. The present invention extends the technique so described in U.K. Patent Application No. 29987/77 by using methods and apparatus which will now be described.

Firstly the present invention proposes that a condensing buffer substance (as hereinbefore described) should be utilised so as to provide a heat sink in heat-conductive relationship with the exhaust passage and/or exhaust chamber to which the working fluid is exhausted after expansion in the working chamber(s) of the motor. The function of the said heat sink is to condense the said exhausted working fluid at the relatively low pressure of the exhausted working fluid, primarily so as to reduce the volume necessary for the containment of the exhausted working fluid and secondly so as to allow any liquid working fluid resulting from such condensation to be pumped back to the power capsule with little consumption of power.

To these ends the present invention proposes that such a heat sink may comprise a suitable quantity of condensing buffer substance which is able to condense the exhausted working fluid by process of liquefaction, adsorption, persorption, association or by other suchlike processes. Dealing first with processes for liquefaction, the present invention proposes for example the use of a condensing buffer substance which has a freezing point, boiling point or other temperature at which a change in its physical, chemical, crystallographic or other stage takes place, this said change of state occurring as the working fluid condenses by liquefaction. Thus for example, the condensing buffer substance may comprise a solution of e.g. 20% by weight of calcium chloride $CaCl_2$ in water which has a freezing point of $-55°$ C. approximately, advantageously encapsulated in small (e.g. 20 mm diameter) spherical or cylindrical capsules or plastics or other suitable material (e.g. of metal in embodiments wherein rapid liquefaction is vitally important). A large number of such capsules may then be loaded, it is proposed, into the exhaust chamber and/or the exhaust passage to which the exhausted working fluid is led after expansion, and cooled by refrigeration or other means before use of the vehicle or other embodiment so as preferably to bring about the freezing of the said condensing buffer substance. Other condensing buffer substances required to perform such liquefaction (which may be complete or partial) include ethylene glycol (known commonly as "antifreeze" and usually diluted with water so as to control its freezing point), ethyl alcohol, glycerine, sodium chloride (these last three also often dissolved in or mixed with water so as to achieve a desired freezing point) and very many others. The condensing buffer substance may also comprise several substances together, as for example the solution of both calcium chloride $CaCl_2$ and sodium chloride NaCl in water. Finally another condensing buffer substance of particular interest is solid $CO_2$ with a freezing point of $-56.6°$ C. (at 5.2 atmospheres) and a partially high latent heat of sublimation.

Dealing secondly with condensation of the exhausted working fluid by processes of adsorption, persorption, association and the like, the present invention proposes that, in some of its embodiments it may be preferable to employ such like processes rather than liquefaction in order to bring about the desired condensation of the exhausted working fluid or in order to employ the exhausted working fluid for other purposes. Thus, for example in a lawn mower motor using $CO_2$ as a working fluid, the exhausted $CO_2$ may be led to a chamber containing material of e.g. the adsorptive, persorptive or associative (reversible physico-chemical) type, the said chamber being in heat-conductive relationship with for example the passage supplying $CO_2$ gas to the motor and/or the working chamber(s) of the motor, in order that the heat of adsorption, persorption or association as the case may be can be employed so as to superheat the working fluid and so increase the economy of gas usage and/or the power of the motor. Again, there are other embodiments of the present invention in which the need for a condensing buffer substance at a lower-than-ambient temperature (and the need for a heat pump or refrigerator to cool such condensing buffer substance) so as to condense the exhausted working fluid by liquefaction may conflict with other desirable properties of such embodiments: thus for example an appliance employing the present invention and used in very hot surroundings (for instance a portable fire appliance used by firemen) may preferably employ a persorber so as to capture and thus conserve the working fluid after use.

Returning however to embodiments of the present invention in which a colder-than-ambient heat sink together with a heat pump or refrigerator is desirable so as to condense the exhausted working fluid by liquefaction for example lorries in which the presence of a quite large quantity of condensing buffer substance at perhaps −30° C. or so may have secondary value as a means to refrigerate the lorry and its cargo (for instance deep-frozen meat) the present invention proposes that one or more heat pump(s) or refrigerator(s)—hereinafter referred to, for convenience, as the "heat pump" should be provided so as to pump heat from the said condensing buffer substance and to one or more buffer substances at one or more higher temperatures. This proposal leads to several important advantages, described as follows.

Firstly, when a halocarbon for instance is employed as the working fluid of the heat pump, for each unit of mechanical energy provided to the compressor of the heat pump, approximately four units of heat energy are transferred from the heat sink to the heat source (that is, in the present invention, from the heat sink constituted by the condensing buffer substance to the heat source(s) constituted by one or more buffer substances at one or more higher temperature(s)). Therefore, if for example a lorry according to the present invention employs a polyethylene glycol with say a 35° C. freezing point as the buffer substance providing latent heat to boil the working fluid, and a calcium chloride solution in water with say a −30° C. freezing point as the condensing buffer substance which condenses the working fluid by liquefaction, then 1 MJ of mechanical energy supplied to the compressor of the heat pump may provide about 4 MJ of heat for boiling (via the 35° C. buffer) as well as 4 MJ of cooling capacity for liquefaction (via the −30° C. condensing buffer). Clearly this is very energy-efficient, especially as with suitable design almost all of the 1 MJ supplied to the heat pump of the lorry will later appear as useful motive energy at the wheels. This aspect of the present invention therefore allows energy to be stored and later converted to useful motive energy, with very little loss.

Secondly, the present invention also proposes that the said heat pump compressor may in some such embodiments be the self-same motor which drives the lorry, vehicle or other artefact embodying the present invention, if the said motor is designed to be operable in reversed mode as a compressor as was disclosed in my U.K. patent application No. 29987/77 and which is incorporated herein by reference.

Thirdly, the provision of a heat pump as proposed in the present invention permits the quantity of condensing and other buffer substance(s) necessary for a long journey or period of use without recharging or refilling, to be reduced very substantially.

A further disclosure according to the present invention is that the working fluid may be used to perform a variety of valuable ancillary functions.

For example in a forklift truck the said gas may be used to lift and lower the fork and other devices using known types of pneumatic cylinder.

For example in a train or other passenger-carrying vehicle the exhaust gas from the motor, being normally below ambient temperature, may be employed in known heat-transfer devices so as to provide cool air to the passengers; to provide cooling or refrigeration or deep-freezing for drinks, foods or perishable goods respectively; etc.

For example in a private car or goods-carrying vehicle, the said gas may be employed in known pneumatic devices so as to raise and lower the windows, the boot-lid, the bonnet, the hatch-back (if any), a tailboard, a platform for loading and unloading heavy goods, the seats, the car or other vehicle itself (so as to jack it up for wheel-changing or other repairs and servicing); to open and close the doors, sunroof, convertible top, etc; to raise and lower any radio aerial; to power-assist the steering; to drive the windscreen wipers; to expel cleaning fluid for the windscreen washers, headlamp washers, rear window washer or even for whole-car washers; to inflate the tyres; in particular within a fraction of a second of a puncture by means of a pressure sensor within each tyre; to adjust the tyre pressures to the load carried and/or to the desired rolling resistance in consideration of the road surface, speed and range of the car or other vehicle; to adjust the suspension height and degree of shock-absorption and suspension spring-rate in consideration of the load carried, the road surface, etc; to provide transient and other anti-roll, anti-pitch and similar suspension corrections when for example cornering, braking and accelerating; to drive air-circulating and ventilation devices; to inflate crash-impacting bumpers and other devices to lessen the risk of personal injury and vehicle damage in collisions and other accidents; to provide an immediate envelope of cool, non-inflammable gas in the event of fire; to blow the horn; to extinguish cigarette and cigar ends; to adjust the headlamps (in particular in a lateral sense when negotiating bends); to draw curtains and to raise and lower blinds, etc. etc.

The above examples are not exhaustive and numerous other services may be performed by means of the sources of gas at various temperatures and pressures within embodiments of the present invention and by means of the types of material and the buffer substances provided by the present invention which therefore claims priority of use only for services as disclosed in the examples given herein and for such like services which depend upon the said sources of gas and/or the said types of material and/or the said buffer substances and/or the other components disclosed herein to be part of embodiments of the present invention.

BRIEF DESCRIPTION OF THE DRAWINGS

FIGS. 3 and 4 illustrate an application of the invention to a car.

Like parts are denoted by like reference numerals throughout the drawings.

DESCRIPTION OF THE PREFERRED EMBODIMENTS

Throughout the following descriptions, all pressures mentioned are absolute pressures.

Figure 1:
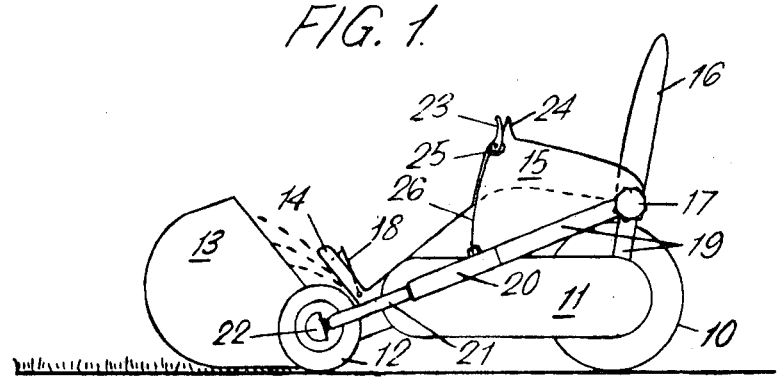
FIG. 1 is an elevation approximately one twenty-fifth full size, of a large motorised lawn mower (but which may equally be adapted to for instance a smaller lawn mower, a golf buggy, a snow sled, a forklift truck or an invalid car, etc., etc.

Referring to FIG. 1, this shows a man-carrying lawnmower designed both to mow and roll large grassed areas typically of one acre and above. The roller 10 is approximately 60 cms. diameter and 100 cms. wide so that the machine may cut and roll a swathe of lawn about 80 cms. wide which, at its design rolling speed of 200 cm/sec, allows it to mow and roll one acre of grass in less than one hour, with allowance for manoeuvring.

Experiments have indicated that a tractive effort in the region of 127 kg is more than ample at 45 cm/sec for turning corners, falling to 28.4 kg at 200 cm/sec when running straight. This equals 556 watts of motive power which, in an electric or battery-electric machine, would normally require an electric motor of about 3. h.p input rating. The machine in FIG. 1 has a useful (i.e. motive) stored energy of 2 MJ, which allows it to develop its full power of 556 motive watts for 1 hour, or half this power for two hours, etc., etc., after which it is recharged from a mains electric point.

A motor compartment 11 contains the power and recharging system components which drive the roller 10 and thereby the cylindrical grass-cutter which is about 80 cms. wide and supported between two steerable wheels 12, which also support the removable grassbox 13, into which grass cuttings are directed by the footrest 14. The driver sits in the armchair 15 which is provided with an adjustable back 16, fixed in its desired position by the seat knob 17, and may control forward speed with the accelerator 18 in the same manner as driving a conventional car, the accelerator being coupled to the control lever of the motor by a "Bowden cable" or other suitable linkage.

The whole machine is built around a triangulated frame of tubular members 19. Power steering is provided according to the present invention by using gas-pressure drive as previously disclosed herein by the technique now described: the tubular members 19 on each side of the mower incorporate a pneumatic cylinder 20 in each of them, coupled to a piston rod 21 and a ball joint 22 on the axle stub-end of each wheel 22; a piston within each pneumatic cylinder is urged by a return spring (not shown) so as to retract when gas is not fed to the said pneumatic cylinder; however a steering control 23 is provided together with a hand grip 24 at the extremity of each armrest of the armchair 15 so that, when a given steering control 23 is squeezed, a valve 25 directs gas from the power capsule within the motor compartment 11 through the pressure hose 26 to the pneumatic cylinder 20; this causes the piston rod 21 to move gradually so as to extend by about 10 cms. each second, thereby giving progressive steering control which is adequate for the purpose. Relaxation of squeeze on the steering control 23 allows the return spring (not shown) to return the piston rod at about the same rate of 10 cm/sec by means of a bleed hole in the piston. If desired the pressure hoses 26 may be crosscoupled to the opposite-side pneumatic cylinders 20 so as to give a possibly more-natural sense of steering. Gas used to effect steering in this way is exhausted to the exhaust chamber contained within the roller 10, as depicted in FIG. 2.

Figure 2:
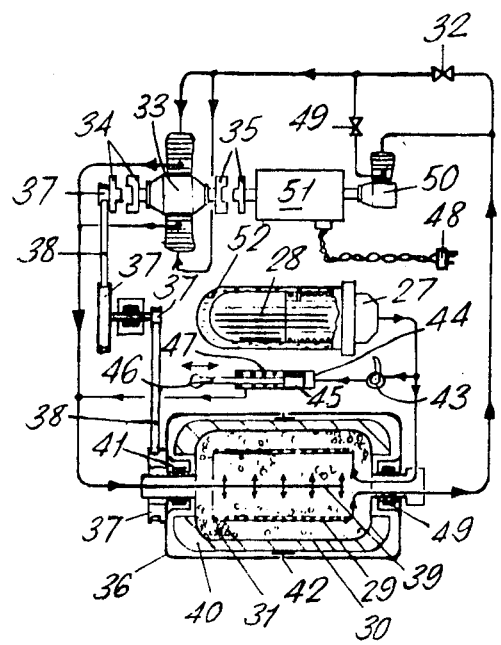
FIG. 2 is a plan view to the same scale as FIG. 1 in the case of the components shown, of the components of the large motorised lawn mower of FIG. 1 which collectively comprise its power and recharging systems, wherein some of the said components are drawn in horizontal cross-section and separated from each other in the manner of an "exploded" drawing for the sake of clarity.

Turning now to FIG. 2, a power capsule 27 of the type disclosed in U.K. patent application No. 29987/77 carries approximately 18 kg of largely-liquefied $CO_2$ which in this embodiment is boiled by approximately 12 kg of water in the buffer type 28 to supply gaseous $CO_2$ at about 30 atmospheres pressure and at about $-5°$ C. to the superheater coil 29 at a flow rate of about 300 gm/min at full rated power. The superheater coil 29 may suitably comprise metal tubing of 3 to 5 mm bore and 10 to 30 meters long, coiled within the exhaust chamber 30 as shown in FIG. 2 so as to be in intimate heat-conductive relationship with approximately 80 kg of the Type 5A (as defined earlier) persorber 31 inside the exhaust chamber 30. $CO_2$ gas leaves the superheater coil at about 100° C. (after a minute or two of warming up) and is fed via the valve 32 (which is open during operation) to the motor 33 which is of the type disclosed in U.K. patent application No. 29987/77 (i.e. of the reversible type, with buffered cylinder walls but with no cylinder wall heating) and which advantageously may be a twin-cylinder version for easier self-starting, with a total swept volume of approximately 100 cc.

During operation the clutch 34 is engaged and the clutch 35 is disengaged so that the motor 33, when running at 1500 rpm, may drive the roller 36 at about 60 rpm via the four pulleys 37 and the transmission belts 38 which provide about 25:1 reduction, so driving the mower at about 188 cm/sec (4.25 mph).

Expanded $CO_2$ is exhausted from the motor 33 at about $-40°$ C. and 2 atmospheres to the spray tube 39 which, by means of several small radial holes, sprays exhausted $CO_2$ gas into the body of the persorber 31. In normal operation the heat of persorption will cause the persorber's temperature to rise to the region of 105° C. in the form of heat wave spreading radially outwards as shown by the small arrows on the spray tube 39 in FIG. 2. Hence the $CO_2$ flowing through the superheater coil 29 is superheated to about 100° C.

The exhaust chamber 30 is lagged with approximately 10 cm.-thick insulation 40 of known types such as glass wool or silicate fibre, etc., the said insulation (which, with the exhaust chamber, does not revolve) providing clearance for the roller 36 which revolves around it, being supported on the bearings 41. The roller is advantageously in two halves so as to facilitate the turning of corners when mowing and to this end may have a slipring 42 made of nylon, polythene, acetal or similar low-friction and high-abrasion-resistance material so as to support the open ends of the two halves of the roller in a concentric manner yet allow differential rotation between the two.

One of the two power-steering assemblies is shown in FIG. 2 and comprises a steering valve 43 which, when squeezed, admits $CO_2$ gas at about 30 atmospheres from the power capsule to the pneumatic cylinder 44 so as to extend the piston 45 and piston rod 46 at about 10 cm/sec. A small bleed hole in the piston 45 allows the return spring 46 to retract when the steering valve 43 is released, the $CO_2$ passing through the bleed hole and exhausting to the exhaust chamber.

The mower is fast-recharged (e.g. in half-an-hour after half-an-hour's use) by disengaging clutch 34 and engaging clutch 35, which advantageously may be performed automatically by a solenoid (not shown) as soon as the recharging plug 48 is plugged into a power point. The same solenoid or one or more similar solenoids (not shown), may advantageously also close the valve 32 and open the valve 49 so as to admit gas during recharging to the small compressor 49 as soon as the plug 48 is plugged in. The compressor 50 is similar to the motor 33 but may need only one cylinder of about 15 cc swept volume; it is coupled to the shaft of an electric motor 51 which, in this embodiment, may advantageously provide about 1 kW of shaft output power at 2000 rpm.

During recharging the electric motor 51 also drives the motor 33 in the reverse mode as a compressor (as disclosed in U.K. patent application No. 29987/77 so as to lower the pressure within the exhaust chamber. This causes the persorber to desorb the $CO_2$ it has previously persorbed and to become very cold in the process, because the heat of persorption previously taken from the persorber must now be returned to it; this cooling effect assists the recompression process considerably, reducing the power needed for compression as well as the temperature of the compressed $CO_2$.

Compressed $CO_2$ flows in a direction opposite to the main arrows in FIG. 2, from the "motor" 33 to the compressor 50, back through the superheater coil 29 (which, being greatly cooled by the persorber, tends to condense the $CO_2$) and finally into the power capsule 27 which is jacketed with approximately 5 kg of polyethylene glycol (hereinafter abbreviated to "PEG") 52 which may advantageously be the type known as PEG 1000, having a molecular weight in the region of 1000 and a freezing band of approximately 35° C. to 40° C. so as to be normally frozen in the climate of use. The effect of the PEG 1000 (reference numeral 52) is to cool the $CO_2$ re-entering the power capsule to about 40° C., whilst the PEG 1000 at least partly melts, taking its own fairly high latent heat of fusion of about 178 J/gm from the $CO_2$ and so encouraging the $CO_2$ to condense when below its critical temperature of 31° C.: to this end it may be preferable in cooler climates to employ a PEG 600 buffer, as PEG 600 has a freezing band of only 17° C.-22° C. which is well below the 31° C. critical temperature of $CO_2$. However, this choice is not of primary importance because the water in the buffer tape 28 will normally be frozen at least in part (especially if recharging is done fairly soon after use of the mower) and will therefore present a large heat transfer surface at 0° C. for the easy condensation of the $CO_2$.

Finally, the above-described motorised mower provides a number of very significant advantages over other types of motor mowers, listed as follows:
  (a) Very quiet operation, the closed-cycle motor making a sound similar to a domestic freezer.
  (b) No exhaust to pollute the atmosphere. No exhaust pipe to corrode.
  (c) Extremely low energy costs of about 2.5 pence per hour when recharged by daytime electricity, falling to about 1.5 p/hour using off-peak electricity.
  (d) No batteries to wear out and be replaced. N.B. A 3 H.P. battery-electric mower's batteries might cost about £80 and last about 5 years so, if used for 40 hours a year, would cost 40 p/hour in battery-replacement costs alone.
  (e) Very quick re-charging e.g. ½ hour after mowing ½ an acre. Even this may be speeded up simply with a higher-power electric motor for recharging.
  (f) Self-starting in all weathers.
  (g) No clutch or gears needed, as the motor gives high torque at low speed.
  (h) No risk of motor burn-out (as in electric types) for the same reason.
  (i) No risk of fire or electric shock.
  (j) Very easy and comfortable to use, with power steering and with no grass cuttings to sweep up. Very little maintenance.
  (k) Low manufacturing cost, as the motor and several other major components may be made largely of plastics materials.

It should be added that the working fluid in the lawn mower embodiment described above and in others may be chosen from very many alternatives, provided that these alternatives are gaseous at familiar climatic temperatures and pressures and can be liquefied by the application of pressure alone. For instance it may be desirable in some applications to employ a working fluid at lower pressures than the 30 atmospheres (approximately) pressure of $CO_2$ when boiled by a water-buffered power capsule: an alternative might be the halocarbon $CF_2Cl_2$ sometimes known as R 12 and commonly used in domestic refrigerators, giving a pressure of about 2.6 atmospheres from a water-buffered power capsule and able to be persorbed by the 5A persorber referred to earlier; another might be the halocarbon known as R 502, giving a corresponding pressure of about 4.8 atmospheres and (because of its larger molecular size) able to be persorbed by the 10A persorber described earlier. Both these halocarbons are inert and non-toxic and so may be used safely.

Of course the techniques used in the above-described lawnmower embodiment may be scaled down for application to smaller lawnmowers etc. or scaled up for application to, for instance, forklift trucks. Forklift trucks are felt to be a particularly attractive application for the present invention which may solve most if not all of the major problems of present-day forklift trucks, namely: very high battery-replacement costs (e.g. £1500); lengthy recharging periods of typically 8 hours (which may be reduced to 2 hours or less with the present invention); risk of sparks and fire or explosion when used in chemical plants, coal mines, etc; poor performance in cold stores; the need for several electric motors to drive the wheels and the forklift; the effort of steering the heavier versions (which may be overcome by the power steering facility of the present invention); the need for artificial weights in the form of massive concrete counterweights as needed in present-day petrol and diesel-engined versions; the atmospheric pollution caused by the exhaust from the latter types especially in confined places; the fire risk of the latter type when used in hazard areas; and the high manufacturing cost of present-day forklift trucks, which may be reduced by perhaps 30% using the present invention.

FIG. 3 is an elevation, approximately one fiftieth full size, of a fairly high performance car, adapted by means of the present invention to be quickly recharged by electricity alone when used from the home or office for commuting, shopping and local trips up to about 150 miles range; but permitting longer journeys of 200–300 miles to be accomplished at relatively high speed after refilling at a service station or even at one's home; and automatically becoming a 150 mile range, electrically-recharged car again at the end of the afore-mentioned longer journey;

FIG. 4 is a plan view, approximately one thirtieth full size, of the main working components of the car shown in FIG. 3, wherein most of the said components are drawn in horizontal cross-section and some others drawn in recognized symbolic form (e.g. pipes, valves, heat exchangers, the feed pump, compressors and rotary transmission links), and wherein most of the said components are separated from each other in the manner of an "exploded" drawing for the sake of clarity.

Like parts are denoted by like reference numerals throughout the drawings. Pressures mentioned in the following description are gauge pressures in pounds per square inch, abbreviated to "psig".

Referring to FIG. 3, this shows a medium performance family car of the "hatchback" type, able to carry two people plus goods or luggage on the rear platform 60 when the rear seat backrests 61 are folded forward to the position shown by the dashed outline 62. Alternatively, four or five people may be carried plus a smaller quantity of goods or luggage, when the rear seat backrests are upright.

The car is shown being refilled with fuel (5 gallons water plus 50 kg of calcium granules) at a service station, in preparation for a non-stop journey of about 200 miles at a cruising speed of about 70 mph.

Also during refilling it is necessary to empty the products of reaction from previous car usage. These products of reaction are mainly comprised of calcium hydroxide $Ca(OH)_2$, known as slaked lime, with a small admixture of calcium sulphate which may be the anhydrite $CaSO_4$ possibly containing some of the hemihydrate $CaSO_4.\frac{1}{2}H_2O$ (known as Plaster of Paris) and some of the dihydrate $CaSO_4.2H_2O$, known as gypsum, together with a little ash residue from combustion of the protective coating on the original calcium granules. Being brittle, friable and fairly harmless (as they are almost identical to powdered concrete with no aggregate) the said products of reaction may be emptied from the reaction chamber 63 by opening the lower flap 64 and allowing them to fall into any suitable container perhaps with the assistance if a vibrator fixed to the reaction chamber wall.

As shown in FIG. 3, the electric-charging cable is carried on a cable drum 65 which may be one of several known types, though advantageously provided with a spring-returned cable and plug of at least 60 amp capacity at 240 volts and preferably, in later models designed for recharging in less than an hour, at least double this current capacity.

Under the bonnet of the car in FIG. 3 are installed firstly a heat sink 66 which essentially comprises a conventional metal tank holding within it numerous containers of a condensing buffer substance which may for instance be a 29% solution of calcium chloride in water, which has a freezing point of about $-55°$ C.; secondly a heat source 67 constituted by a cylindrical (for example) vessel containing a buffer substance which may for example be polyethylene glycol of molecular weight 10,000 or above and thirdly an intermediate store 68 which comprises a smaller cylindrical (for example) tank containing a buffer substance.

Turning now to FIG. 4 the car's energy system will now be described. An exhaust chamber 69 of approximately 0.3 cubic meter capacity contains about 250 kg of a 29% solution of calcium chloride in water encapsulated in numerous plastic spheres of about 20 mm diameter in order to constitute a heat sink 70 for condensation of the working fluid which in this embodiment may enter the exhaust chanber as R 502 vapour 71.

However there may be some disadvantage in using R 502 at the superheating temperature proposed in this embodiment (which might cause some decomposition of the R 502) and so the following alternatives may be preferable:

| Working fluid | Chemical Formula | Boiling Point @ 1 atmos. |
|---|---|---|
| Halocarbon R 12 | $CCl_2F_2$ | $-29.8°$ C. |
| Halocarbon R 13 | $CClF_3$ | $-81.4°$ C. |
| Halocarbon R 13B1 | $CBrF_3$ | $-57.75°$ C. |
| Halocarbon R 23 | $CHF_3$ | $-82.03°$ C. |
| Halocarbon R 115 | $C_2ClF_5$ | $-38.7°$ C. |
| Halocarbon R 116 | $C_2F_6$ | $-78.2°$ C. |
| Halocarbon R 500 | Azeotrope of $CCl_2F_2$ & $C_2H_4F_2$ | $-33.5°$ C. |

Of the above, the halocarbons R 12. R 115 and R 500 may be preferable because they can be easily condensed at low gauge pressures and at temperatures in the region of $-29°$ C., $-38°$ C. and $-33°$ C. respectively, which may be more attractive than the about $-45°$ C. required for Halocarbon R 502 because the heat transfer surface area of the heat sink may thereby be reduced, or the freezing point of the condensing buffer substance (i.e. the calcium chloride solution for example) increased so as to reduce the insulation required around the exhaust chamber (not shown in FIG. 4). Alternatively the exhaust chamber may be designed to withstand much higher gauge pressures in which case the lower boiling point working fluids may be used, giving an increase in cycle efficiency. In another case the use of $CO_2$ as a working fluid provides an interesting alternative because, if the exhaust chamber temperature is held below $-56.6°$ C., solid $CO_2$ will form at exhaust chamber pressures below about 60 psig: such solid $CO_2$—frequently known as "dry ice"—has a very high latent heat of vapourisation of 562 joules per gram at 0 psig and so can serve as the condensing buffer substance of the heat sink as well as the working fluid, dispensing with the need for the encapsulated calcium chloride solution or other condensing buffer substance.

However the above is not an exhaustive list of the working fluids which may be used in the present embodiment; they may be chosen from a very large number of alternatives and those given above are only mentioned because they have desirable properties such as non-inflammability, non-toxicity, cheapness and ready availability. It is entirely possible to employ alternative working fluids having for instance a boiling point considerably higher than those given above: for instance halocarbons R 21, R 114, R 114B2 which have normal boiling points of 8.92° C., 3.77° C. and 47.26° C. respectively; but such relatively high boiling points are not in general to be preferred firstly because the pressure after boiling may be undesirably low unless boiling is done at rather a high temperature, secondly because the opportunity to employ heat from the ambient air is reduced, and thirdly because the overall cycle's energy economy may be somewhat impaired.

The forward part of the exhaust chamber is stepped down to form a well 72 in which condensed liquid working fluid 73 may collect. This liquid is pumped by a small feed pump 74 to a radiator 75 through which ambient air passes due to the forward motion of the car or with the assistance of a fan (not shown, being of known types.) This increases the liquid working fluid temperature to the region of $-5°$ C. (more in warm weather) and may cause condensation of atmospheric water vapor into water or even ice: such condensation may be used to advantage firstly as a means of collecting the free heat of condensation of water vapour in the ambient air so as to increase the cycle efficiency or to reduce the size of the radiator, secondly to reduce the size of the subsequent heat source used for boiling, and thirdly to collect water during motion if so desired for replenishment of the water needed for reaction or humidification etc.

Thence the liquid is piped to the heat source 76 which in this embodiment comprises approximately 180 kg of polyethylene glycol, held in a cylindrical or other suitably-shaped tank. There the liquid working fluid is boiled as it passes through a coiled pipe 77 or other known type of heat-exchanging means. The heat source is also used to supply vehicle heating as shown in FIG. 4. The coiled pipe 77 contains anti-bumping material.

Next the vapour is piped to the reaction chamber 78 where it is superheated by further coiled pipes forming one or more superheaters 79. The reaction chamber is constituted by a metallic vessel 80 provided with insulation 81 to prevent heat loss and which advantageously may comprise a material of exceptionally high insulating qualities such as MICROPORE (Registered Trade Mark).

To the reaction vessel are metered calcium granules, advantageously of a size smaller than rice grains and coated with lacquer or plastic to present slow attack by atmospheric water vapour, contained within the calcium tank 82 and metered by means of the valve 83.

At the beginning of a long journey the $H_2SO_4$ bottle 84 containing about 2 pints of dilute $H_2SO_4$ is partly drained through the valve 85 into the reaction vessel so as to raise the reaction temperature quickly with the energetic first-stage reaction:

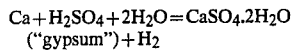

$$Ca + H_2SO_4 + 2H_2O = CaSO_4.2H_2O$$
("gypsum") + $H_2$

Simultaneously ambient air 86 is admitted to the reaction vessel so as to burn the hydrogen from stage one, this comprising the stage two reaction and providing further heat energy as well as hot nitrogen which advantageously is piped away from the reaction vessel and through a coiled pipe (not shown) in the heat source 78 so as to be cooled before exhaust to atmosphere.

Thereafter water is metered via the valve 87 from the water tank 88 preferably to the base of the reaction vessel, whilst further calcium granules are metered in about it. The purpose of this arrangement is to permit "fluidised bed" reaction between the calcium granules and the steam produced as the water boils underneath, because fluidised bed reaction is particularly efficient, provides very high heat transfer rates, and also promotes the formation of a friable, powdered "ash" of calcium hydroxide in the stage three reaction:

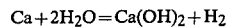

$$Ca + 2H_2O = Ca(OH)_2 + H_2$$

Again the hydrogen so produced is burnt in admitted ambient air and the nitrogen so heated is cooled in the heat source 76 and then exhausted.

During these latter two reactions the gypsum from stage one is dehydrated progressively, first to the hemihydrate $CaSO_4.\frac{1}{2}H_2O$ (known as Plaster of Paris) and then to the anhydrite $CaSO_4$: both of these dehydrations cause shrinkage of the original gypsum and help to maintain the calcium hydroxide in a granulated, porous, friable and brittle mass, thereby to assist reaction and the ultimate easy discharge of the calcium hydroxide from the reaction vessel through its lower flap (not shown in FIG. 4 but shown in FIG. 3, reference numeral 64) before the next refuelling for a long journey.

The superheated working fluid is first admitted to the high pressure ("H.P.") cylinders 89 of each of two engines 90. Each such engine may typically have four cylinders (two H.P. and two low-pressure or "L.P.") and a swept volume in the region of one liter so as to be able to produce a shaft output at maximum rated speed of approximately 50 b.h.p.

It should be added that the present embodiment does not propose the use of buffered cylinder walls as disclosed in U.K. patent application No. 29987/77 or of cylinder wall heating as disclosed hereinbefore, in the interests of manufacturing economy and light weight. Instead, and in order to increase cycle efficiency rather than economy of gas usage (which is not so important in a continuously-recycling system such as this), the working fluid, upon exhaust from the H.P. cylinders is led back to reheaters 91 in the reaction vessel, and then admitted to the L.P. cylinders 92 of the two engines; here it is expanded and led by the exhaust passages 93 back to the exhaust chamber for condensation.

The above-described recirculation system would, it is emphasized, work without any further elaboration in vehicles of up to about 80 MJ of stored motive energy i.e. about 30 b.h.p.-hours. However, though sufficient for say an invalid car or forklift truck, 80 MJ will take a medium-performance family car only about 50 miles at 75 mph. To increase this high-speed range to 250 miles requires approximately 400 MJ (150 b.h.p.-hours) and, if the energy system were left as described so far, would require the exhaust chamber to be increased to about 1.5 cubic meters and 1500 kg weight, and the heat source to be increased to about 2 cubic meters and 2000 kg weight. This would imply a car of the size of a VW "Caravette" weighing about $4\frac{1}{2}$ tonnes, with too much air-resistance to achieve more than about 125 miles at 75 mph, and therefore requiring double the energy cost per mile of the present embodiment.

The front wheels of the car may be linked by the clutch-brakes 94 to two small compressors 95 and 96 upon a signal from the driver for example by the brake pedal which, with increasing foot pressure, progressively increases the compressive flow capacity of both compressors as disclosed earlier in this specification. The compressor 95 takes suction of the main working fluid from the vapour space in the exhaust chamber and compresses it in gaseous form. This "hot" gas is piped to the intermediate store 97 (containing perhaps 30 kg of a buffer substance having a freezing point of between say 0° C. and 100° C. and passed through a condenser 98 which cools and condenses the gas.

This high-pressure liquid working fluid is then expanded by the pressure-reducing valve 99 in the known manner of domestic refrigerators so as to produce a very cold wet vapour which is returned to the exhaust chamber. By this means 1 MJ of energy taken from the offside front wheel for example may pump about 4 MJ of heat out of the heat sink so as to keep it completely or partly frozen at say −55° C.; at the same time about 4 MJ of heat will be pumped into the intermediate store 97 in the known manner of a heat pump.

Similarly the compressor 96 takes suction of a working fluid (which may be the same as the main working fluid or which may advantageously be another working fluid such as ammonia $NH_3$, halocarbon R 12 or other fluid suitable for pumping heat) and, compresses it using the energy from the other front wheel to a gas at high pressure. This hot gas is piped to the heat source 76 where it condenses to a high-pressure liquid in the condenser 100. Then it is expanded by the pressure-reducing valve 101 to produce a cold wet vapour which is led through the evaporator 102 (which advantageously may contain some anti-bumping material such as fused alumina) in the intermediate store 97, where it is more completely evaporated to provide the gaseous suction for the compressor 96. By this means 1 MJ of energy taken from the nearside front wheel for example may pump the 4 MJ of heat which was heat-pumped to the intermediate store 97 by the other compressor 95 and at the same time deliver about 4 MJ of heat to the heat source 76.

This elaboration of the system by use of the two said compressors provides some quite dramatic advantages, as follows.

Firstly, a one tonne vehicle travelling at 60 mph has about 0.36 MJ of kinetic energy, of which 0.3 MJ is available at the brakes every time the vehicle is braked to say 25 mph. Studies suggest that in typical car usage on major and minor roads (not motorways) such braking may be needed at least ten times per hour so, in a three-hour journey, $30 \times 0.3 = 9$ MJ of kinetic energy may be used to pump $4 \times 9 = 36$ MJ of heat.

Secondly, a one tonne vehicle coming down a hill 100 meters high will release about 0.98 MJ, of which perhaps 0.8 MJ may be available at the brakes. Again studies suggest that in road journeys in Britain and probably in most other countries—but not on most motorways—downhill slopes may allow again typically about 9 MJ of such potential energy to be recovered at the clutch-brakes 94 of the present embodiment. Again this may be used to pump about $4 \times 9 = 36$ MJ of heat. These two lots of 36 MJ allow the heat sink to be lightened by about 120 kg and the heat source to be lightened by about 200 kg below their respective masses which would be needed without such regenerative braking.

On motorways however, regenerative braking is unlikely to provide enough pumped heat to allow the heat sink and source to be reduced to desirably small sizes and weights, because of their absence of traffic lights, roundabouts and traffic jams—and of steep downgrades—which would require application of the clutch-brakes of the present embodiment.

Therefore the present embodiment allows the clutch-brakes 94 to be applied—by a signal from the driver in much the same circumstances and manner as he would switch into 'overdrive'—whenever cruising speed has been reached and further acceleration is not normally required, though he can of course switch back to direct drive so as to achieve high acceleration for overtaking, etc., etc., at a moment's notice, either by switching out the 'overdrive' or by a "kickdown" action of the accelerator pedal.

In overdrive however, acceleration is naturally lower, with the clutch-brakes applied and the compressors set to a part-load setting. This has the effect of causing a less rapid pumping of heat than in the case of braking but—because it may continue for quite long cruising periods—may jump very considerable quantities of heat from the heat sink to the heat source. Thus, for example if 30 b.h.p. is redirected in this way for perhaps one hour of cruising, then 160 MJ of heat may be pumped from the heat sink and to the heat source.

Also shown in FIG. 4 are the two A.C. Motors 103 coupled to the compressors by rotary transmission links. These A.C. Motors have two primary functions: firstly part or all of the windings of one or both of them—which may be of the same type as in present-day alternators as used in cars—may be used to supply electricity generated during motion of the car (when the clutch-brakes are applied) to a car battery as in present-day cars, so as to provide a source of electricity for lights, headlamps, radio, stereo and any other services not operable by gas pressure; secondly during recharging of the car by electricity the A.C. Motors are connected to a mains electric power point and, with the clutch-brakes disengaged, used to drive the two compressors so as to freeze the condensing buffer substance of the heat sink and to melt the buffer substance of the heat source.

At the end of a long journey of say 250 miles at 75 mph when all of the calcium has been converted into calcium hydroxide ("slaked lime") with a little calcium sulphate content, the car may then be used as a short range vehicle of say 150 mile range at about 45 mph average, by recharging with electricity at home or office etc. without the need to visit e.g. a service station for further "fuel", and at extremely low energy cost. This is done, advantageously at the same time as driving the A.C. Motors as described above and perhaps with the same electric plug 104 on a long charging cable stored on the cable drum 105 by means of the electric heater 106 which in this embodiment is installed on the outer surface of the reaction vessel so as to be in good thermal contact with it but thermally insulated against heat loss to the environment by the insulation 81.

The said electric heater is used to dissociate and drive off water from the calcium hydroxide by heating the latter to 500°–600° C., converting it thereby to calcium oxide CaO, otherwise known commonly as "quicklime". The electrical energy necessary to accomplish this in the present embodiment will be approximately 50 kw-hr. About a further 10 units will be required to drive the two A.C. Motors during recharging, giving a total recharging requirement of about 60 units.

The steam driven off during recharging may be collected and condensed within the water tank 88 so as to avoid the need to refill the water tank with 5 gallons of water prior to subsequent usage: minor topping-up may be all that is then required.

In the short-range mode the present embodiment, after recharging, will have 70 kg of quicklime in the reaction vessel and 22.5 kg (5 gallons) of water in the water tank, the latter being fed back to the base of the reaction vessel via the valve 87 during driving, being metered by control devices in the same way as for long-range operation as previously disclosed. The consequent slaking of the quickline again allows a reaction temperature in the region of 350° C. to be sustained so, if desired, the car's performance and acceleration will be no less than it was in the long range mode. Thereby quick getaways from traffic lights etc. are possible and indeed sports-car performance could be achieved if desired.

I claim:

1. A gas powered motor having: means for holding liquified gas; conduit means to deliver gas from the holding means to the motor to power the motor; receiving means for expanded gas from the motor; further conduit means for delivering expanded gas from the motor to the receiving means; solid condensing buffer means in the receiving means which associate exothermically with and upon receipt of expanded gas to condense and hold the gas and release heat therefrom; heat exchange means for heat exchange between the first conduit means and said solid condensing buffer means for superheating the gas flowing through the conduit means to the motor by the heat released from the expanded gas; and means to subject the receiving means to reduced pressure to extract the condensed gas therefrom and to return the extracted gas to the holding means.

2. A gas powered motor as claimed in claim 1 wherein the condensing buffer substance associates exothermically with the expanded gas and heat exchange means are provided between said receiving means having the condensing buffer substance and the said first conduit means for transferring heat from the receiving means to the gas to be supplied to the motor during running of the motor and, during extraction of gas from the receiving means, to cool the gas extracted and thereby assist in re-liquefying the gas.

3. A gas powered motor as claimed in claim 2 wherein said holding means comprise a reservoir for the liquefied gas and said first conduit means is a delivery conduit from said reservoir to the motor.

4. A gas powered motor as claimed in claim 3 wherein said heat exchange means are connected in said delivery conduit.

5. A gas powered motor as claimed in claim 2 wherein said receiving means comprise a vessel in communication with the exhaust from the motor and containing said condensing buffer substance and said heat exchange means.

6. A gas powered motor as claimed in claim 5 wherein said heat exchange means comprise a heat exchange conduit extending through said gas receiving means and connected to said conduit means for gas to the motor.

7. A gas powered motor as claimed in claim 5 wherein said gas receiving vessel is enclosed in thermal insulation.

8. A gas powered motor as claimed in claim 5 wherein said condensing buffer substance comprises means to adsorb or persorb gas exothermically at pressures received from the motor when running and to release the gas at reduced pressures endothermically.

9. A gas powered motor as claimed in claim 8 wherein the persorber material used is chabazite or crystalline potassium alumino-silicate, crystalline sodium alumino-silicate or crystalline calcium alumino-silicate.

10. A gas powered motor as claimed in claim 1, wherein said means for holding liquefied gas is a reservoir in thermal communication with a container holding a buffer substance for releasing heat to said reservoir and the liquefied gas therein, whereby the tendency of the evaporation of the liquefied gas to cool the remaining liquefied gas in the vessel is at least partly counteractive.

11. A gas powered motor as claimed in claim 10 wherein the buffer substance is contained in a jacket surrounding said reservoir.

12. A gas powered motor as claimed in claim 10 in which said buffer substance is a liquid which freezes at a temperature between temperature and the final operating temperature of the liquefied gas.

13. A gas powered motor as claimed in claim 10 wherein said container of the buffer substance is located within said reservoir.

14. A gas powered motor as claimed in claim 10 wherein said reservoir has both an encircling container for buffer substance and an internal container for buffer substance.

15. A gas powered motor as claimed in claim 14 wherein the buffer substance in at least one of said containers is water which cools to form ice by giving up its latent heat of fusion to supply heat to said liquefied gas in the container.

16. A gas powered motor as claimed in claim 15 including an additional container of buffer substance in communication with said reservoir, wherein the additional buffer substance is a polyethylene glycol to assist in condensing gas returned to the reservoir by melting and thereby absorbing latent heat from the gas.

17. A gas powered motor as claimed in claim 1 wherein said means for holding liquefied gas for powering the motor contains liquefied carbon dioxide.

18. A gas powered motor as claimed in claim 1 wherein pump means are provided for reducing the pressure in said receiving means to extract the gas from said receiving means and returning the gas to said gas holding means.

19. A gas powered motor as claimed in claim 18 wherein said pump means comprise an electric motor driven pump connected between said receiving means and said gas holding means.

20. A gas powered motor as claimed in claim 18 wherein said pump means comprise the gas powered motor and an electric motor for driving said motor in reverse to act as a pump to extract gas from said receiving means and return it to said holding means.

21. A gas powered motor as claimed in claim 20 wherein said motor has an output drive provided with a clutch which can be disengaged when said motor is to operate as a pump.

22. A gas powered motor as claimed in claim 21 including a further electric motor driven pump wherein the electric motor for the further pump has a drive output both to the further pump and through a clutch to the gas powered motor to drive both the further pump and the gas powered motor as a pump.

23. A gas powered motor as claimed in claim 22 further including a ram for operating one or more ancillary devices connected through valve means to said holding means.

* * * * *

UNITED STATES PATENT AND TRADEMARK OFFICE
CERTIFICATE OF CORRECTION

PATENT NO. : 4,327,553
DATED : May 4, 1982
INVENTOR(S) : JOHN WALTER RILETT

It is certified that error appears in the above—identified patent and that said Letters Patent is hereby corrected as shown below:

```
Col. 3, line  3 change "shift" to --lift--.
Col. 3, line 63 change "skin" to --akin--.
Col. 3, line 64 change "absorbed" to --adsorbed--.
Col. 5, line 50 change "absorbed" to --adsorbed--.
Col. 5, line 59 change "in" to --is--.
Col. 6, line 34 change "exit" to --exist--.
Col. 6, line 53 change "solved" to --sociated--.
Col. 6, line 56 change "then" to --than--.

Col. 8, line 17 change "20%" to --29%--.
Col. 8, line 43 change "partially" to --particularly--.

Col. 12, line 3 change "type" to --tape--.
Col. 13, line 8 after "No. 29987/77" insert --)--.
```

Signed and Sealed this

Seventeenth Day of August 1982

[SEAL]

Attest:

*Attesting Officer*

GERALD J. MOSSINGHOFF
*Commissioner of Patents and Trademarks*